Jan. 13, 1959

W. O. LUM 2,868,223

VALVES

Filed Nov. 3, 1954

INVENTOR.
WALTER O. LUM

BY

*A. J. Nydick*

ATTORNEY

United States Patent Office 2,868,223
Patented Jan. 13, 1959

2,868,223

VALVES

Walter O. Lum, Livingston, N. J., assignor to Arthur C. Homeyer, Essex Falls, N. J.

Application November 3, 1954, Serial No. 466,613

3 Claims. (Cl. 137—454.6)

This invention relates to fluid distribution systems; and in particular is directed to improvements in the valving members thereof.

In the pending application of Arthur C. Homeyer et al., Ser. No. 372,086, filed August 3, 1953, there is described the advantage of employing a novel form of valving mechanism for fluid distribution systems. They describe a system wherein a housing is adapted to receive a readily replaceable unit or cartridge that embodies the fluid control elements, i. e., the valve mechanism proper, such mechanism being actuated by externally disposed appropriate means connected with, linked to, or associated with the aforesaid housing.

In the said application, Homeyer et al., point out that theretofore, when valve members of fluid distribution systems required repair, it was necessary either to remove the entire valve from the system and replace it by a new member, or to disassemble the valve in situ, examine the same and replace the parts which became worn away or had broken. Such methods of repair or replacing defective valves entail considerable time with correlative high repair costs.

It is also pointed out in said application that where the valves of ordinary or customary construction are constantly subjected to use, as for example, in dispensing water coolers, faucets and the like, the maintenance or replacement of the valves is very expensive.

In the case of water dispensers provided with ordinary valving, either when owned outright by the user thereof or installed by a service rental firm, they are either examined periodically or serviced by a repair man who is summoned to attend to a defective condition. Any repair or replacement of the valves in such devices is an expensive item.

In the said application, Homeyer et al., describe a cartridge-like unit containing the valving mechanism proper, which can be "dropped in" into an appropriate housing member somewhat as a cartridge and which can be removed in a minimum amount of time. In such a system, the service man can remove a defective unit, replace the same with a new one (or a rebuilt one in good condition) and take the withdrawn one back to the shop for re-examination, repair or rebuilding. In this way, the time of a service man or plumber consumed in removing a defective valve from the system is held to a minimum with a concomitant drastic reduction in expense.

I have found that a cartridge-like valve unit of the class described can be constructed much more expeditiously than has been proposed by Homeyer et al. in their said pending application; and accordingly, the instant invention is directed to an improved form of such unit.

It is, therefore, among the principal objects of this invention to provide an improved valve unit of cartridge-like form adapted for positioning in appropriate housing which is characterized by marked simplicity in structure.

A further object of this invention is to provide a valve unit of cartridge-like form which consists of two readily separable components, to wit, a liquid chamber and a cover member therefor which contains the movable mechanism of the valve.

A still further object of this invention is to provide a valve unit of cartridge-like form composed of the two readily separable components set forth above, each of which can be separately inspected and tested.

An even further object of this invention is to provide a valve unit of cartridge-like form composed of two readily separable components aforesaid wherein the liquid chamber component is readily assembled from greatly simplified elements.

A further object of the invention is to provide a cartridge-like valve unit composed of the two readily separable components aforesaid characterized by market sturdiness and greatly improved ease of assembling and disassembling the same.

In its fundamental aspects, my cartridge-like valve unit is composed of a liquid chamber which is devoid of movable or sliding parts, thus eliminating faulty operation which arises from accumulation of mineral deposits that are present in all normal city water supplies; and a cover member therefor which embodies the movable mechanism of the valve including a gasket that combines the cover for the liquid chamber and a flow regulating diaphragm, the valve disc which cooperates with the inwardly directed valve seat (contained within the liquid chamber) to function both as a shutoff and flow regulating valve, the flow regulating spring and the adjusting device therefor and the valve closure spring.

The said liquid chamber fundamentally consists of a cylindrical cup within which is a fluid duct piece which allows fluid to fill the cup and emerge therefrom through an outlet. The cover member includes a movable stirrup adapted to receive within it the discharge end of said duct piece. The stirrup carries a valve closure that bears against the aforesaid discharge head of the duct piece by virtue of spring tension pulling on the stirrup. When that spring tension is released, the cover member is readily removed from closing engagement with the discharge head.

Figures 1, 2:
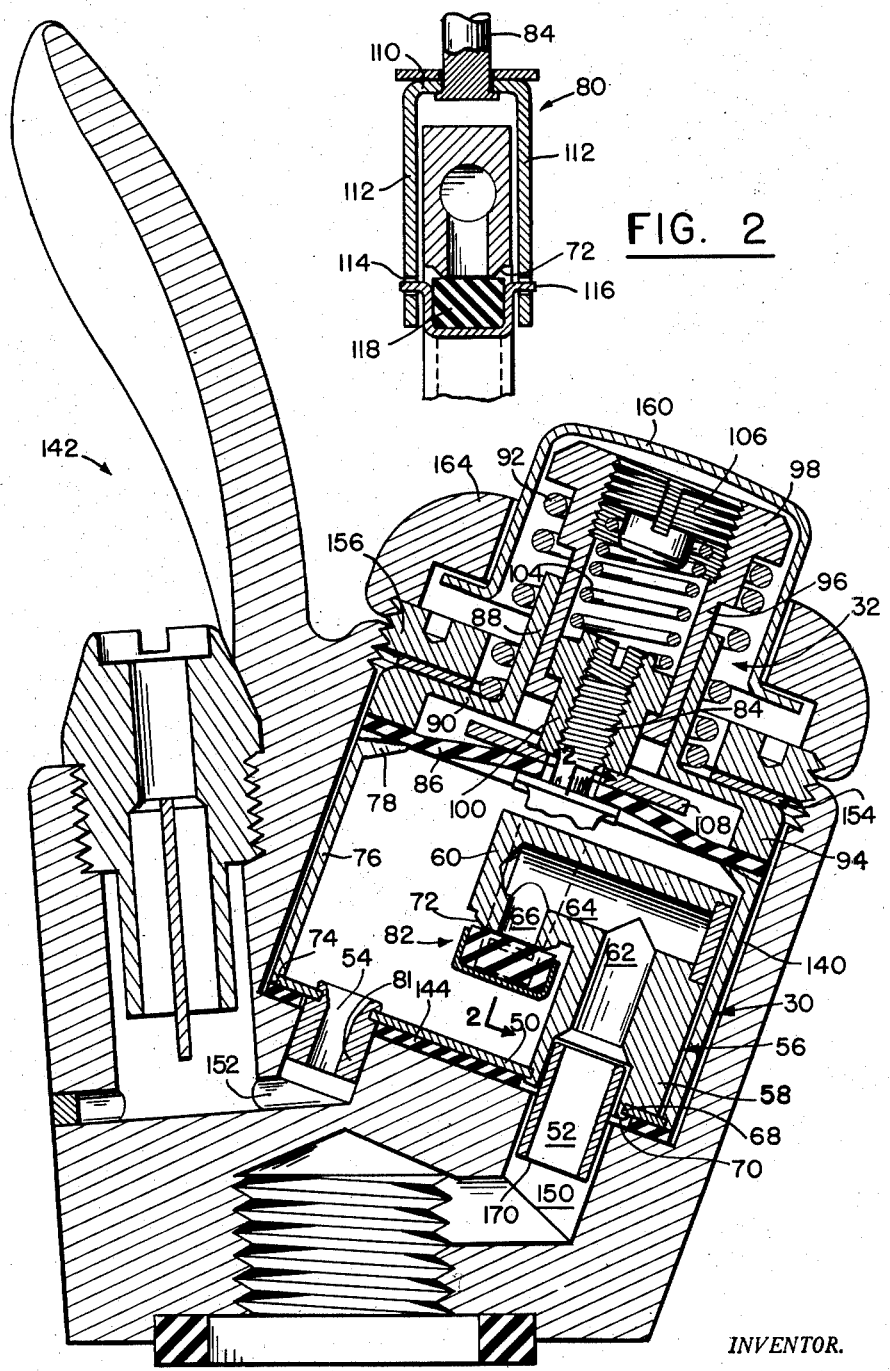
Fig. 1 is a vertical cross-sectional view of the dispensing head of a water cooler or fountain showing the disposition therein of a cartridge valve unit in accordance with this invention.
Fig. 2 is a cross section, taken on the line 2—2 of Fig. 1 showing the disposition of the discharge end of the fluid duct piece within the stirrup that carries the movable valve closure.

As shown in the drawing, the valve unit comprises the liquid chamber 30 and the cover assembly therefor 32. The liquid chamber 30 is a cylindrical cup in which is disposed the fluid duct piece that embodies an inverted J-shaped duct. The chamber comprises base plate or disc 50 having a fluid inlet orifice 52 and a fluid outlet orifice 54. Affixed to disc 50 is an L-shaped fluid duct piece 56 having a leg 58 and a leg 60. Within the duct piece is an inverted J-shaped channel or duct formed of duct sections 62, 64 and 66. The duct piece is affixed to the disc 50 by positioning the shouldered lower end 68 of leg 58 within the orifice 52, as by peening said end over the plate as at 70 or by any other suitable means. The outlet end of duct section 66 terminates in a bevelled annular head as at 72. This plate assembly of disc 50 and duct piece 56 may then be set within the shouldered end 74 of tubular element 76, the opposite end of which element be inwardly flanged, as at 78. The plate assembly may be firmly affixed to 76 by soldering or peening or any other suitable means. A nipple 81 may be secured to the outlet orifice 54.

The cover assembly 32 comprises: stirrup 80 having a valve closure 82 at its lower end and a threaded stem 84 at the other end, the diaphragm 86, and spring means for moving or actuating the stirrup. The cover member is assembled by placing the diaphragm 86 on top of the stirrup, the stem 84 of the latter passing through a central aperture in 86. A washer may then be mounted on top of the diaphragm. There is then placed on the periphery of the diaphragm the tubular spring guide 88, the lower end of which is outwardly flanged as at 90, the said flange being provided with a peripherally disposed downwardly extending lip or rim 94. A helical valve closure spring 92 is then placed over guide 88, the bottom of the spring being seated on the flange 90. Then the tubular housing 96 which houses a flow adjusting spring is set within 88. The external end of 96 is flanged as at 98 thereby providing a stop for the other end of valve closure spring 92. Nut 100 is then placed on stem 84 and run down so as to securely lock the diaphragm to the stirrup. Flow adjusting helical spring 104 is then placed within housing 96. It is maintained in position by screw 106. The tension on spring 104 is regulated by appropriate adjustment of 106. A lock washer may be used between 100 and 108 to prevent loosening in service.

The stirrup 80 may be formed from a strip of metal to provide a centrally disposed bar 110 and two bent-off lengths extending parallel to each other which constitute legs 112. Stem 84 is affixed to bar 110. Legs 112 may each be provided with a slot 114 in alignment to receive the ears 116 of the small cup 82 within which is a resilient valve seat or valve closing element 118.

As the cover member is thus assembled, the stirrup is drawn into the cover member to its full extent. To insert the stirrup into the liquid chamber and position the fluid duct piece thereof in operative disposition, the valve closure spring 92 is compressed by pushing 98 downwardly. With the stirrup thus moved forwardly, it can be slipped over the short leg 60 of the duct piece and the diaphragm 86 seated in the covering position atop the liquid chamber. Upon releasing the tension on spring 92, the stirrup moves back into the cover member and comes to rest when the sealing element meets the discharge head 72. Thus, the cover member is securely held by the liquid chamber and the valve unit is completely assembled.

As is now apparent, the cover member may be readily separated from the liquid chamber by releasing the upward pull of the stirrup against the duct piece, moving the stirrup away from the duct piece into free space, and withdrawing the cover member from the liquid chamber. As is also now apparent, each of these two members of the valve unit can be separately inspected and tested; and if rejected because of defects they can be discarded or the defects rectified.

As shown in Fig. 1, the assembled valve unit is placed in the cavity 140 of the dispensing head 142 of a water cooler, being seated on a washer 144, if described, so that the inlet and the outlet orifices of the unit are aligned with the water supply line 150 and the delivery line 152.

A washer 154 may be positioned on the upper side of cover flange 90 and an externally threaded spanner ring 156 screwed in to lock the unit in position. A push button 160 is then placed over flange 98, following which bonnet nut 164 is screwed on to the spanner ring. By depressing the push button 160 against the biasing of spring 92, the stirrup is moved downwardly and the fluid begins to flow through the valve. The pressure of the downstream flow is regulated by appropriate adjustment of the pressure on the diaphragm through the setting of the screw 106.

It is advantageous to provide, as described by Homeyer and Kramer in the aforesaid pending application, for the building up of pressure within the valve unit by making the outlet orifice 60 smaller than the inlet orifice 58. In that way pressure is built up within the unit and the diaphragm provides for maintaining the pressure at the desired level.

It will be noted that the upper face of flange 78 is shown with an upwardly rising slope, as for example of 5° from the horizontal. The provision of such a slope enhances the sealing of the diaphragm on the liquid chamber.

A nipple 170 may be set into the lower end of 62, thereby providing for the fitted communication between fluid supply line 150 and the intake section 62 of the fluid duct.

It will be noted that the provision of the cover member with the flow adjusting spring makes it possible to adjust the valve to provide for a constant flow of liquid at any desired rate. In the absence of that spring, the valve unit provides an on-or-off control of the liquid flow. If the pressure on the flow adjusting spring is increased by the appropriate setting of screw 106 so that nut 100 is maintained against the bottom of tubular housing 96, the valve then provides only on-or-off control of the liquid flow.

When a valve unit is removed from an installation, it can immediately be disasembled into liquid chamber and cover member, each of which can be examined. If only one of those members is defective, it can be replaced by a sound member and the unit immediately reinstalled. If both members are defective, a whole unit can be inserted in the cavity from which the defective unit was removed.

It will be understood that the foregoing description of the invention and the embodiment shown are merely illustrative of the principles thereof. Accordingly, the appended claims are to be construed as defining the invention within the full spirit and scope thereof.

I claim:

1. A cartridge valve unit comprising, in combination, a main body portion having a cylindrical side wall and a bottom wall, a removable cover member mounted upon the top of said main body portion defining a fluid storage chamber therewith, a fluid inlet and a fluid outlet in said bottom wall communicating with the interior of said chamber, an inverted L-shaped duct piece having an inverted J-shaped duct in communication at one end with said inlet and terminating at the opposite end in a discharge opening facing toward and spaced from said bottom wall, a valve closure stirrup member extending through said cover member at one end and having a valve closure element supported for selective movement between an open and a closed position with said discharge opening of said duct piece, spring means acting between said stirrup member and said cover member biasing said valve closure element toward said closed position, said valve closure element being normally disposed between said discharge opening and said bottom wall, and the distance between the widest portion of said L-shaped duct piece and the inner surface of said side wall being greater than the width of said valve closure element, whereby said stirrup is movable between said widest portion of said L-shaped duct piece and the inner surface of said side wall and removable through said top of said main body portion.

2. A cartridge valve unit comprising, in combination, a main body portion having a cylindrical side wall and a bottom wall, a removable cover member mounted upon the top of said main body portion defining a fluid storage completely enclosed chamber therewith, a fluid inlet and a fluid outlet in said bottom wall communicating with the interior of said chamber, an inverted L-shaped duct piece having an inverted J-shaped duct in communication at one end with said inlet and terminating at the other end in a discharge opening facing toward and spaced from said bottom wall, a valve closure stirrup member extending through said cover member at one end and having a valve closure element supported for selective movement between an open and a closed position with said discharge opening of said duct piece, spring means acting between said stirrup member and said cover member biasing said valve closure element in said closed position, said inverted L-shaped duct piece comprising a leg portion and an intersecting base portion, said leg portion being substantially parallel to the longitudinal axis of said chamber, the free end of said leg portion being connected to said bottom wall, said intersecting base portion extending in spaced parallel relationship to said bottom wall, and the free end of said base portion being spaced from said cylindrical side wall a sufficient distance to accommodate the movement of said valve closure element therethrough.

3. A cartridge valve unit as set forth in claim 2, wherein said removable cover member comprises a flexible diaphragm, said stirrup member extending substantially concentrically through said cover member and being secured thereto, said flexible diaphragm being yieldable to permit yielding reciprocating movement of said stirrup and said central portion of said cover member relative to said main body portion.

References Cited in the file of this patent

UNITED STATES PATENTS

| | | |
|---|---|---|
| 1,196,377 | Millea | Aug. 29, 1916 |
| 1,242,713 | Millea | Oct. 9, 1917 |
| 1,637,230 | Mueller | July 26, 1927 |
| 1,793,292 | Taylor | Feb. 17, 1931 |

FOREIGN PATENTS

| | | |
|---|---|---|
| 487,690 | Germany | Dec. 12, 1929 |